(12) United States Patent  
Shimizu

(10) Patent No.: US 9,436,312 B2  
(45) Date of Patent: Sep. 6, 2016

(54) INPUT APPARATUS AND CONTROL METHOD FOR INPUT APPARATUS

(75) Inventor: Katsuhiko Shimizu, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 588 days.

(21) Appl. No.: 13/392,874

(22) PCT Filed: Aug. 26, 2010

(86) PCT No.: PCT/JP2010/005272  
§ 371 (c)(1),  
(2), (4) Date: Feb. 27, 2012

(87) PCT Pub. No.: WO2011/024459  
PCT Pub. Date: Mar. 3, 2011

(65) Prior Publication Data  
US 2012/0154330 A1 Jun. 21, 2012

(30) Foreign Application Priority Data  
Aug. 27, 2009 (JP) ................................ 2009-197377

(51) Int. Cl.  
*G06F 3/045* (2006.01)  
*G06F 3/041* (2006.01)  
*G06F 3/01* (2006.01)

(52) U.S. Cl.  
CPC .............. *G06F 3/0416* (2013.01); *G06F 3/016* (2013.01); *G06F 3/0414* (2013.01)

(58) Field of Classification Search  
CPC .............. B41J 2/04581; B41J 2/04541; B41J 2/04588  
See application file for complete search history.

(56) References Cited

U.S. PATENT DOCUMENTS

2006/0017481 A1* 1/2006 Yoshikawa ................... 327/170  
2006/0052143 A9 3/2006 Tuovinen

FOREIGN PATENT DOCUMENTS

DE 4439048 A1 * 5/1996 ............. G01N 29/02  
JP 63-130357 A 6/1988  
(Continued)

OTHER PUBLICATIONS

International Search Report; PCT/JP2010/005272; Nov. 22, 2010.  
(Continued)

*Primary Examiner* — Alexander Eisen  
*Assistant Examiner* — Nan-Ying Yang  
(74) *Attorney, Agent, or Firm* — Studebaker & Brackett PC

(57) ABSTRACT

An input apparatus includes: a touch sensor 11; a piezoelectric element 13; a piezoelectric element drive unit 15; a control unit 17 configured to detect a pressure load on the touch sensor 11 based on an output signal of the piezoelectric element 13 and, when the pressure load satisfies a standard to provide a tactile sensation, to control the piezoelectric element drive unit 15 to drive the piezoelectric element 13 such that the tactile sensation is provided to a pressing object; a connection switchover unit 14 configured to selectively connect the piezoelectric element 13 to the control unit 17 or the piezoelectric element drive unit 15; and a discharge circuit 16 configured to discharge electric charge in the piezoelectric element 13. When the pressure load satisfies the standard, the control unit 17 controls the connection switchover unit 14 to connect the piezoelectric element 13 to the piezoelectric element drive unit 15 such that the piezoelectric element 13 is driven, and then controls the discharge circuit 16 to discharge the electric charge in the piezoelectric element 13.

4 Claims, 6 Drawing Sheets

(56) References Cited

FOREIGN PATENT DOCUMENTS

| JP | 11-212725 A |   | 8/1999  |          |
|----|-------------|---|---------|----------|
| JP | 11212725 A  | * | 8/1999  | G06F 3/33 |
| JP | 2002-339872 |   | 11/2002 |          |
| JP | 2003-288158 A |   | 10/2003 |        |
| JP | 2008-130055 A |   | 6/2008  |        |

OTHER PUBLICATIONS

An Office Action issued by the Korean Intellectual Property Office on May 28, 2013, which corresponds to Korean Patent Application No. 10-2012-7005039 and is related to U.S. Appl. No. 13/392,874; with translation.

The extended European Search Report dated Feb. 15, 2013, which corresponds to EP Application No. 10811515.5 and is related to U.S. Appl. No. 13/392,874.

Notification of the First Office Action issued by the State Intellectual Property Office of China on Mar. 31, 2014, which corresponds to Chinese Patent Application No. 201080038150.1 and is related to U.S. Appl. No. 13/392,874; with English language translation.

An Office Action; "Communication pursuant to Article 94(3) EPC," issued by the European Patent Office on Jun. 18, 2014, which corresponds to European Patent Application No. 10 811 515.5-1954 and is related to U.S. Appl. No. 13/392,874.

* cited by examiner

FIG. 5
(a)
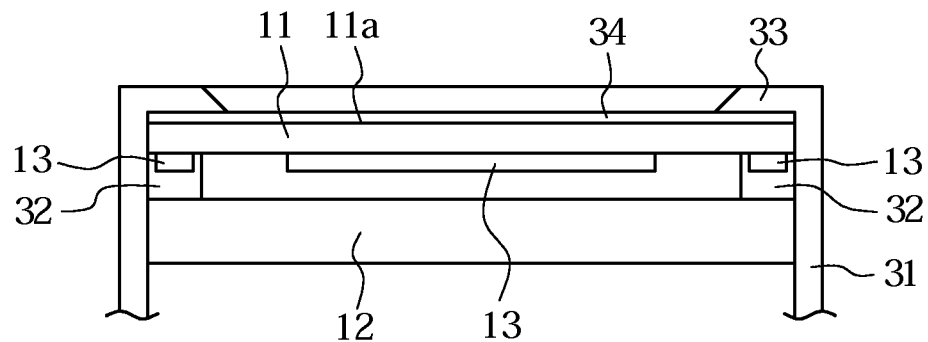
(b)
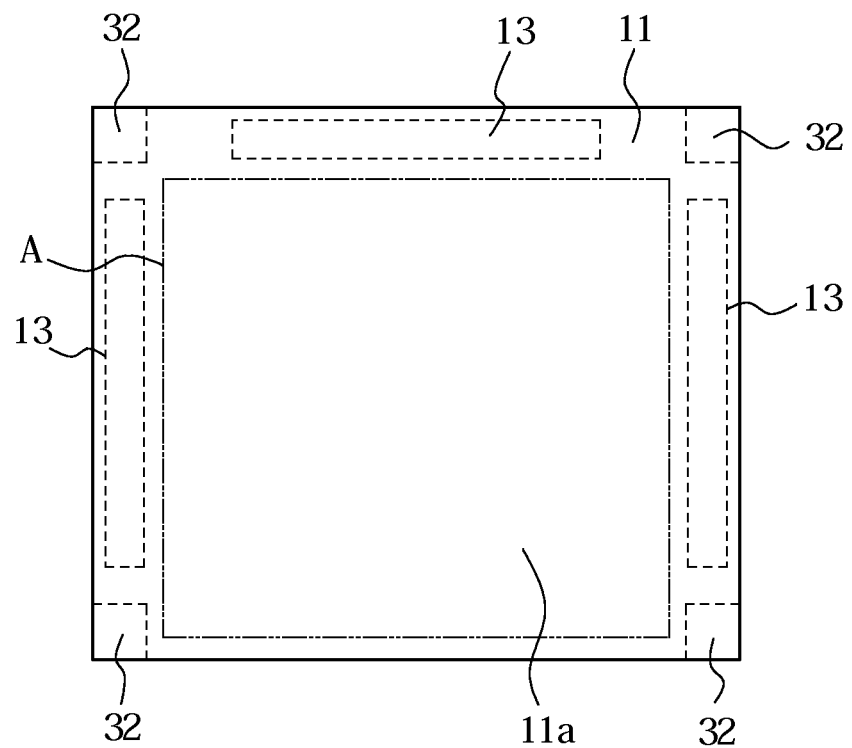

US 9,436,312 B2

INPUT APPARATUS AND CONTROL METHOD FOR INPUT APPARATUS

CROSS REFERENCE TO RELATED APPLICATION

This application claims priority to and the benefit of Japanese Patent Application No. 2009-197377 filed on Aug. 27, 2009, the entire contents of which are incorporated herein by reference.

TECHNICAL FIELD

The present invention relates to an input apparatus having a touch sensor and a control method for an input apparatus.

BACKGROUND ART

In recent years, input apparatuses having touch sensors such as touch panels, touch switches or the like are popularly used as input apparatuses such as operation units, switches and the like for receiving input operations by a user in mobile terminals such as mobile phones, information equipments such as calculator, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of any of these types receive a touch input by a finger or a stylus pen and, unlike push-button switches, the touch sensors themselves are not physically displaced even when being touched.

Since the touch sensors are not physically displaced when touched, an operator cannot obtain feedback to an input even when the touch input is received. As a result, the operator is likely to input erroneously by touching the same spot multiple times, which may be stressful for the operator.

As methods to prevent such erroneous inputs, there are known methods of visually or auditory confirming the input operations by, for example, generating sounds or by changing a display state, such as colors of input objects such as input buttons and the like graphically depicted on a display unit, according to an input area upon reception of the touch input.

However, such auditory feedback may be difficult to be confirmed in a noisy environment and is not applicable when the equipment being used is in a silent mode. In addition, in using such visual feedback, if the input object displayed on the display unit is small, the operator may not be able to confirm the change in the display state, as a view of the input object is blocked by a finger, particularly when the operator is inputting by the finger.

There is also suggested a feedback method relying on neither the auditory- nor visual sensation but instead generating a tactile sensation at operator's fingertip by vibrating the touch sensor when the touch sensor receives an input (for example, see Patent Documents 1, 2).

RELATED ART DOCUMENTS

Patent Documents
Patent Document 1: Japanese Patent Laid-Open No. 2003-288158 Patent Document 2: Japanese Patent Laid-Open No. 2008-130055

SUMMARY OF INVENTION

Technical Problem

The techniques disclosed in the above Patent Documents 1 and 2, however, merely vibrate the touch sensor when the touch sensor receives an input. Therefore, especially in using the input apparatus having the button switch such as a mechanical push-button switch (push-type button switch) graphically depicted on the touch sensor having a low threshold to receive the input, a tactile sensation is provided when the finger or the like lightly contacts (touches) the touch sensor. It may trigger erroneous operations by responding to an unintentional motion (touch) before the operator pushes and inflict a feeling of strangeness on the operator upon the unintentional motion (touch). Here, the threshold for the touch sensor to receive a touch input is a threshold at which the touch sensor responds. For a touch sensor of the resistive film type, the threshold is a threshold of pressure at which an upper conductive film is contacted to a lower conductive film and, for a touch sensor of the capacitive type, the threshold is a threshold for detection of an electric signal by contact.

In order to clear such a disadvantage, the applicant has developed an input apparatus which detects a pressure load on a touch face of the touch sensor and, when the pressure load detected reaches a predetermined threshold to provide the tactile sensation, vibrates the touch face of the touch sensor such that the tactile sensation is provided to a pressing object such as the finger or the like.

According to this input apparatus, the tactile sensation is provided when the operator pushes the touch face and the pressure load of the push reaches the predetermined threshold. As a result, it is possible to allow the operator to perceive reception of an input while reliably preventing erroneous operations triggered by an unintentional touch described above and the feeling of strangeness.

Incidentally, the input apparatus needs a load sensor to detect the pressure load on the touch sensor and an actuator to vibrate the touch sensor in addition to basic components such as the touch sensor and a control unit. As a result, the number of components and cost are increased, as well as a size of the apparatus to retain necessary space for the components.

In order to reduce cost and the size of the apparatus, the applicant has developed an apparatus which utilizes direct piezoelectric effect and converse piezoelectric effect of a piezoelectric element serving dual function as the load sensor to detect the pressure load on the touch face of the touch sensor and the actuator to vibrate the touch face.

As a result of various experiments and studies, however, the inventor observed that, in using the piezoelectric element for dual function as the load sensor and as the actuator, there is a need for an improvement as follows. For example, when the touch sensor is continuously pressed in the same manner as a repetitive input (repetitive tap) to a push-button key, the piezoelectric element is bent at each pressing. As a result, as illustrated in FIG. 6, before electrical charge generated in the piezoelectric element due to bend of the piezoelectric element is completely discharged, the electric charge is generated in the piezoelectric element in next pressing, and thereby the output voltage of the piezoelectric element is increased.

Accordingly, if the piezoelectric element is controlled to function as the actuator to vibrate the touch face when the output voltage, or the pressure load of the piezoelectric element, increases and exceeds a predetermined threshold Vref, the output voltage exceeding the threshold Vref is not detected in some cases depending on the setting of threshold Vref. For example, although the output voltage of the piezoelectric element exceeding the threshold Vref only in first pressing or the output voltages only in first and second pressing are detected (in a case of FIG. 6), the output voltages in pressings thereafter stay over the threshold Vref, and thus it is not detected that the output voltages exceed the threshold Vref.

In the case of FIG. 6, as a result, the piezoelectric element are controlled to function as the actuator to vibrate the touch face in response to only the first and second pressing, but not in response to pressing thereafter. Accordingly, since the tactile sensation is provided to the operator only in response to the first and second pressing but not provided in response to pressing thereafter in continuous pressing, the operator may have the feeling of strangeness.

Hence, an object of the present invention, in consideration of such a condition, is to provide an input apparatus, which reduces cost and its size and appropriately provides the tactile sensation to the operator without inflicting the feeling of strangeness on the operator in operating the touch sensor.

Solution to Problem

In order to achieve the above object, an input apparatus according to a first aspect of the present invention includes:

a touch sensor configured to detect a touch input;

a piezoelectric element mounted on the touch sensor;

a piezoelectric element drive unit configured to drive the piezoelectric element;

a control unit configured to detect a pressure load on a touch face of the touch sensor based on an output signal of the piezoelectric element and to control the piezoelectric element drive unit, when the pressure load detected satisfies a standard to provide a tactile sensation, to drive the piezoelectric element such that the tactile sensation is provided to an object pressing the touch face;

a connection switchover unit configured to selectively connect the piezoelectric element to the control unit or the piezoelectric element drive unit; and a discharge circuit configured to discharge electric charge accumulated in the piezoelectric element, wherein the control unit, when the pressure load detected based on the output signal of the piezoelectric element input via the connection switchover unit satisfies the standard, controls the connection switchover unit to connect the piezoelectric element to the piezoelectric element drive unit such that the piezoelectric element is driven by the piezoelectric element drive unit, and then the control unit controls the discharge circuit to discharge the electric charge accumulated in the piezoelectric element.

A second aspect of the present invention is the input apparatus according to the first aspect, wherein the discharge circuit has a switching element connected between the piezoelectric element and ground, and the control unit, after vibration of the piezoelectric element by the piezoelectric element drive unit, conducts the switching element for a predetermined period such that the electric charge accumulated in the piezoelectric element is discharged.

A third aspect of the present invention is the input apparatus according to the first aspect, wherein the discharge circuit has a resistor element connected between the piezoelectric element and ground.

In addition, in order to achieve the above object, a control method of an input apparatus according to a fourth aspect of the present invention including a touch sensor configured to detect a touch input, a piezoelectric element mounted on the touch sensor, a piezoelectric element drive unit configured to drive the piezoelectric element, a connection switchover unit configured to selectively connect the piezoelectric element to the piezoelectric element drive unit, and a discharge circuit configured to discharge electric charge accumulated in the piezoelectric element, including the steps of:

detecting a pressure load on a touch face of the touch sensor based on an output signal of the piezoelectric element and controlling the connection switchover unit, when the pressure load detected satisfies a standard to provide a tactile sensation, to connect the piezoelectric element to the piezoelectric element drive unit and controlling the piezoelectric element drive unit to drive the piezoelectric element such that the tactile sensation is provided to an object pressing the touch face; and then controlling the discharge circuit to discharge the electric charge accumulated in the piezoelectric element.

Effect of the Invention

The input apparatus according to the present invention, utilizing direct piezoelectric effect and converse piezoelectric effect of the piezoelectric element, uses the piezoelectric element as a load sensor to detect the pressure load on the touch face of the touch sensor and as an actuator to vibrate the touch face. It is thus possible to reduce the number of components and the cost as well as to save space for the components for downsizing the apparatus. In addition, after drive of the piezoelectric element, while the piezoelectric element is electrically disconnected from the piezoelectric element drive unit, the discharge circuit discharges electric charge (residual electric charge) accumulated in the piezoelectric element. Therefore, it is possible to prevent continuous accumulation of the electric charge in the piezoelectric element is prevented and the tactile sensation is reliably provide in a continuous input as well without inflicting a feeling of strangeness on an operator.

BRIEF DESCRIPTION OF DRAWINGS

FIG. 5 illustrates a cross-sectional view of a main section and a plane view of the main section which are illustrating an exemplary housing structure of the input apparatus according to the present invention.

DESCRIPTION OF EMBODIMENTS

Embodiments of the present invention will be described with reference to the accompanying drawings.

First Embodiment

Figure 1:
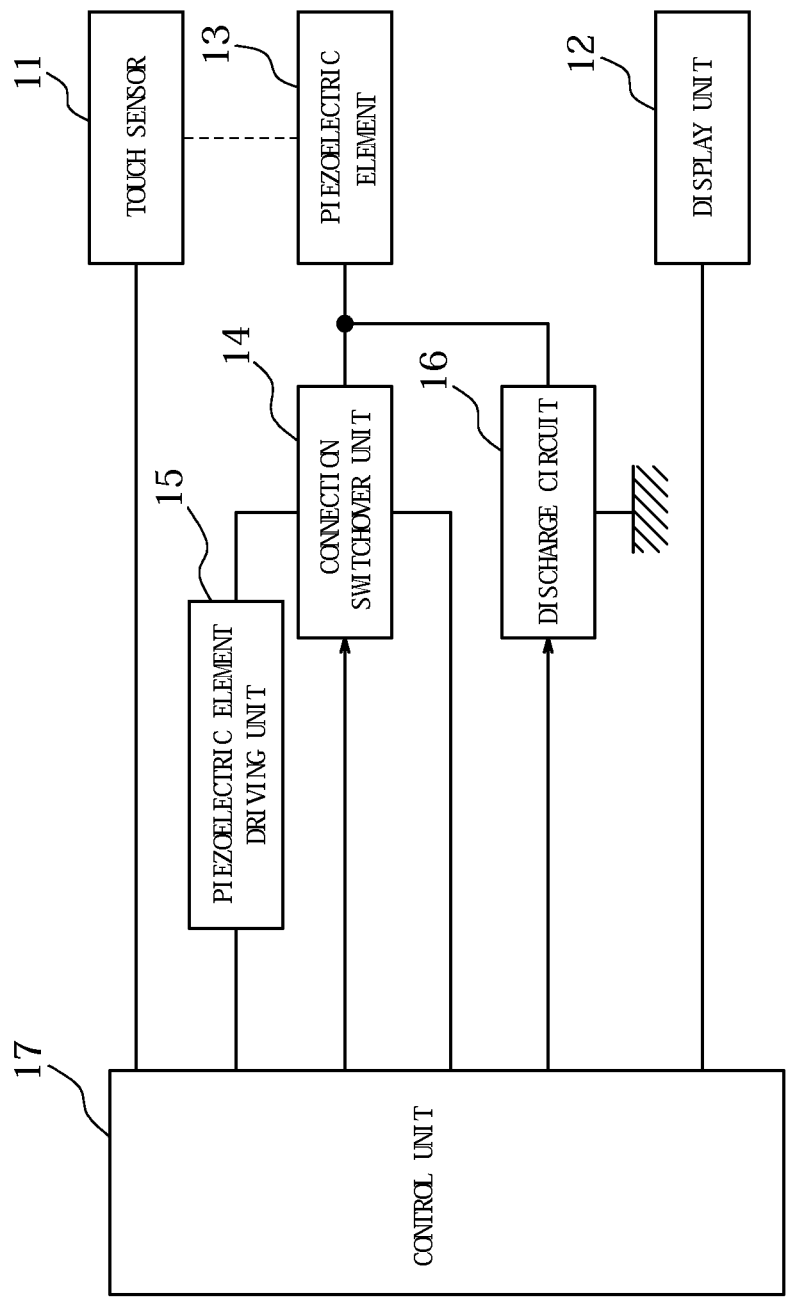
FIG. 1 is a functional block diagram illustrating a schematic configuration of an input apparatus according to a first embodiment of the present invention.

FIG. 1 is a functional block diagram illustrating a schematic configuration of an input apparatus according to a first embodiment of the present invention. This input apparatus has a touch sensor 11, a display unit 12, a piezoelectric element 13, a connection switchover unit 14, a piezoelectric element drive unit 15, a discharge circuit 16, and a control unit 17 to control an operation of each unit.

The touch sensor 11 is connected to the control unit 17 and, under control of the control unit 17, detects a touch input to a touch face of the touch sensor 11 by a pressing object, such as a finger and the like, and provides the control unit 17 with position information of a touch position. The touch sensor 11 may be of a known type, such as a resistive film type, a capacitive type, an optical type and the like, and disposed on the display unit 12.

The display unit 12 is connected to the control unit 17 and, under control of the control unit 17, displays an input object of an input button and the like such as a push-button switch (push-type button switch). The display unit 12 may be constituted by, for example, a liquid crystal display panel, an organic EL display panel and the like. The touch input to the input object displayed on the display unit 12 is detected by the control unit 17 based on the position information output from the touch sensor 11.

The piezoelectric element 13 is mounted on the touch sensor 11 and designed to be bent (strained) under pressure on the touch face of the touch sensor 11. The piezoelectric element 13 is connected to the connection switchover unit 14 and selectively connected to the control unit 17 or the piezoelectric element drive unit 15 via the connection switchover unit 14.

The connection switchover unit 14 may include a switch circuit and the like as described below and, under control of the control unit 17, selectively connects the piezoelectric element 13 to the control unit 17 or the piezoelectric element drive unit 15. The piezoelectric element drive unit 15 may include a power amplifier and the like and outputs a predetermined drive signal to vibrate the piezoelectric element 13 under control of the control unit 17.

While the piezoelectric element 13 is connected to the control unit 17 via the connection switchover unit 14, an output signal of the piezoelectric element 13, that is, a voltage of electric charge generated by pressure on the touch face of the touch sensor 11 is supplied to the control unit 17. In addition, while the piezoelectric element 13 is connected to the piezoelectric element drive unit 15 via the connection switchover unit 14, the drive signal of the piezoelectric element drive unit 15 is supplied to the piezoelectric element 13 to drive the piezoelectric element 13. Thereby, the touch sensor 11 is vibrated and provides a tactile sensation to the pressing object pressing the touch face.

The discharge circuit 16 may include a switching element connected to the piezoelectric element 13 as describe below and, under control of the control unit 17, discharges the electric charge (residual electric charge) accumulated in the piezoelectric element 13.

The control unit 17 may be, for example, a CPU and the like and controls an operation of each unit based on the position information from the touch sensor 11, display information for the display unit 12, the output signal of the piezoelectric element 13 and the like.

Figure 2:
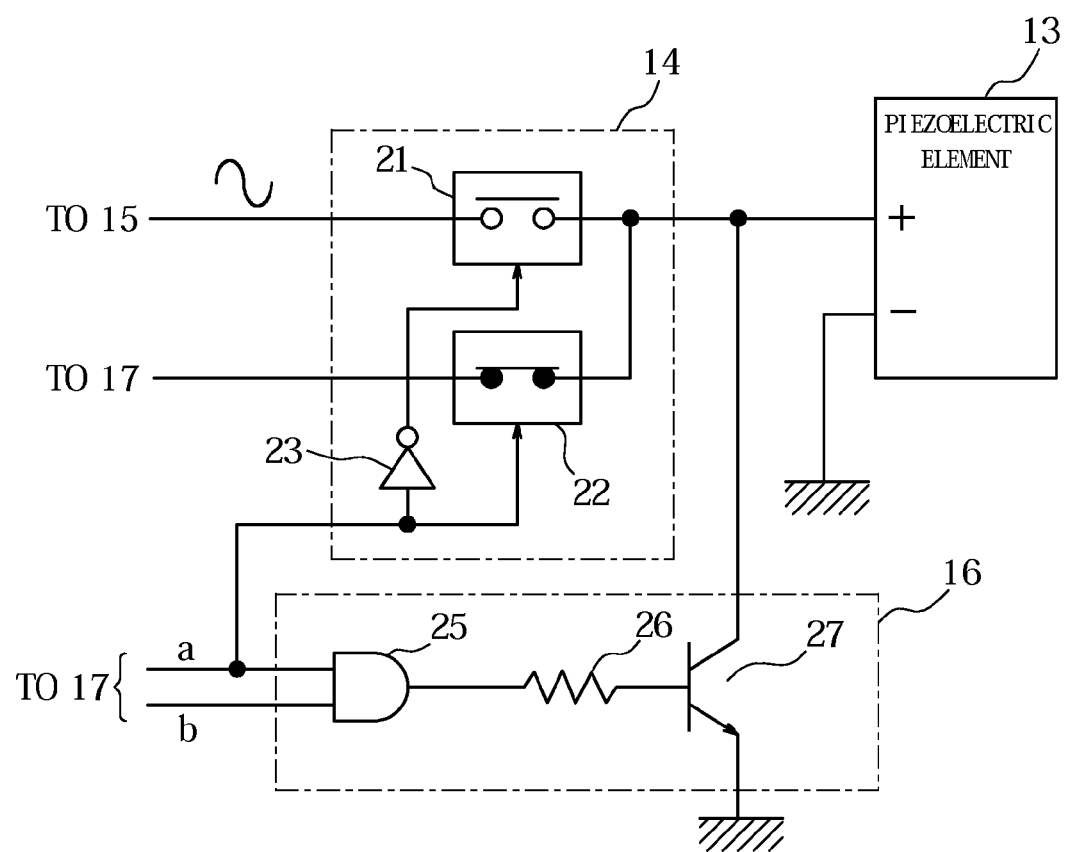
FIG. 2 is a circuit diagram illustrating an example of a configuration of a connection switchover unit and a discharge circuit illustrated in FIG. 1.

FIG. 2 is a circuit diagram illustrating an example of a configuration of the connection switchover unit 14 and the discharge circuit 16 illustrated in FIG. 1. The connection switchover unit 14 includes two switch circuits 21, 22, which may be semiconductor relays and the like, and an inverter 23. Each of the switch circuits 21, 22 has an ON/OFF contact point. The ON/OFF contact point of the switch circuit 21 is connected between a positive electrode terminal of the piezoelectric element 13 and an output terminal (not illustrated) of the piezoelectric element drive unit 15. The ON/Off contact point of the switch circuit 22 is connected between the positive electrode terminal of the piezoelectric element 13 and an analogue/digital conversion input terminal (not illustrated) of the control unit 17.

The ON/OFF contact point of the switch circuit 21 is turned ON/OFF by a switch changeover signal a output from the control unit 17 through the inverter 23. The ON/OFF contact point of the switch circuit 22 is turned ON/OFF by the switch changeover signal a set forth above. Accordingly, when one of the contact points of the switch circuits 21, 22 is ON, the other is OFF.

The discharge circuit 16 has an AND (logical conjunction) circuit 25, a resistor 26, and a switching transistor 27 for discharge. A discharge control signal b output from the control unit 17 and the switch changeover signal a set forth above are input to the AND circuit 25, and an output from the AND circuit 25 is supplied to a base of the switching transistor 27 via the resistor 26. The positive electrode terminal of the piezoelectric element 13 is connected to ground via a collector-emitter pathway of the switching transistor 27.

Figure 3:
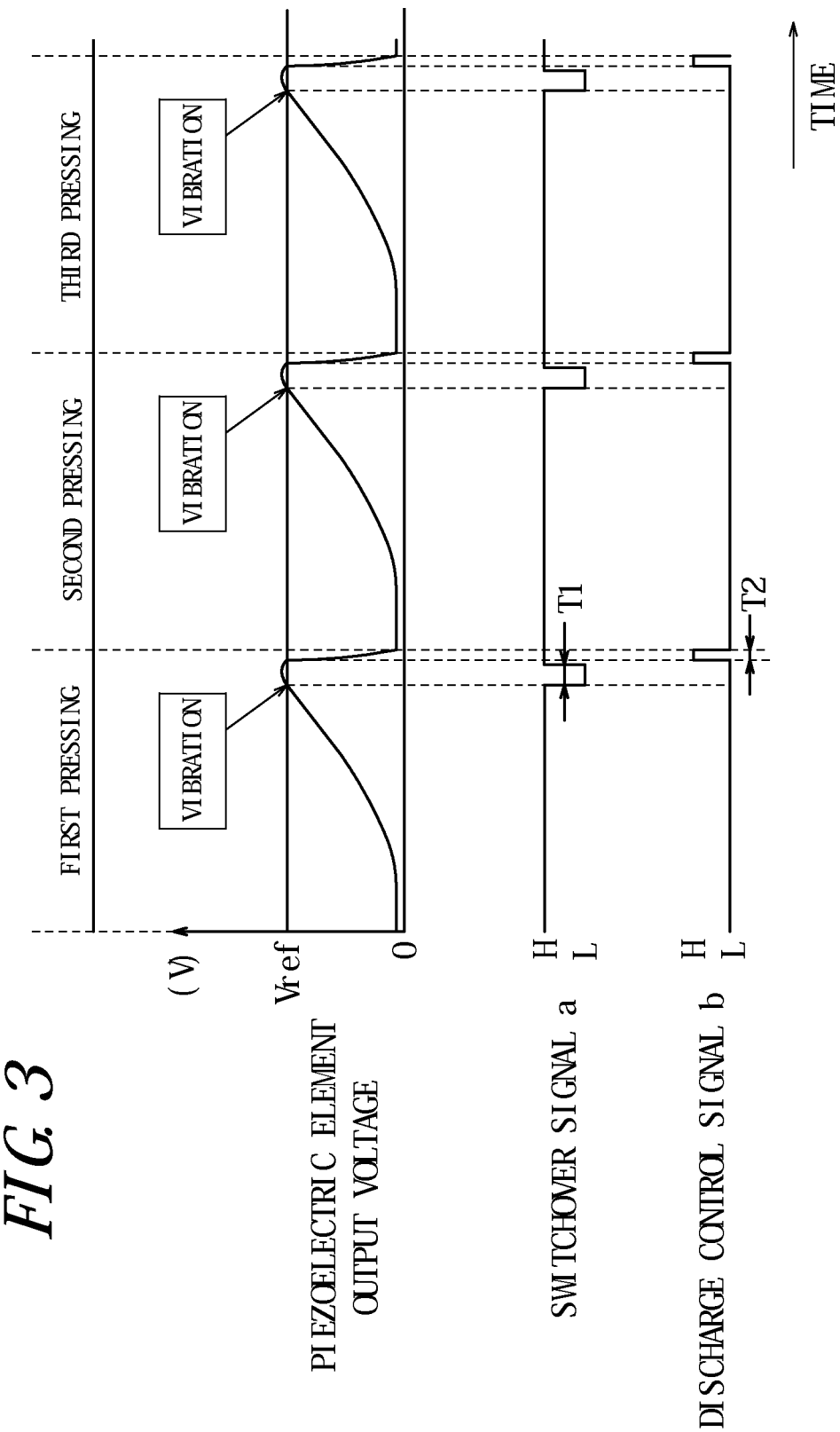
FIG. 3 is a timing chart illustrating a schematic operation of the input apparatus illustrated in FIG. 1.

FIG. 3 is a timing chart illustrating a schematic operation of the input apparatus according to the present embodiment. FIG. 3 illustrates the switch changeover signal a and the discharge control signal b, which are output from the control unit 17, and the output signal (voltage) of the piezoelectric element 13 in a continuous input (repetitive tap) by continuously pressing the touch face of the touch sensor 11. The control unit 17 ordinarily sets the switch changeover signal a at a high (H) level and the discharge control signal b at a low (L) level. Thereby, the piezoelectric element 13 is connected to the control unit 17 by turning the switch circuit 21 of the switchover control unit 14 OFF and the switch circuit 22 ON. In addition, the discharge circuit 16 sets the output of the AND circuit 25 at the level L and turns the switching transistor 27 OFF.

In this state, the control unit 17 monitors an output of the touch sensor 11 and the output signal (voltage) of the piezoelectric element 13. When detecting that the position information from the touch sensor 11 indicates that an input is performed to the input object displayed on the display unit 12 and the output voltage of the piezoelectric element 13 has reached a threshold Vref corresponding to a standard load to provide a tactile sensation (for example, 1 N), the control unit 17 sets the switch changeover signal a at the level L. Thereby, the control unit 17 connects the piezoelectric element 13 to the piezoelectric element drive unit 15 by turning the switch circuit 21 of the switchover control unit 14 ON and the switch circuit 22 OFF.

In this state, then, the control unit 17 controls the piezoelectric element drive unit 15 to output the predetermined drive signal to drive the piezoelectric element 13. Thereby, the touch panel 11 is vibrated such that the tactile sensation is provided to the pressing object pressing the touch face. In addition, the control unit 17 performs predetermined operations for the input object in the display unit 12 such as, for example, changing a display state, displaying a character corresponding to the input object in a predetermined display area, executing and processing application corresponding to the input object, and the like.

Then, when the piezoelectric element drive unit 15 finishes driving the piezoelectric element 13, the control unit 17 sets the switch changeover signal a at the level H and turns the switch circuit 21 and the switch circuit 22 back to OFF and ON, respectively. Thereby, the piezoelectric element 13 is disconnected from the piezoelectric drive unit 15 and connected to the control unit 17. Here, a period $T_1$ to maintain the switch changeover signal a at the level L may be fixedly set (for example, approximately 5 ms) including a drive time of the piezoelectric element 13 or automatically set according to the drive time to drive the piezoelectric element 13 by the drive signal corresponding to the tactile sensation to provide.

Then, while the switch changeover signal a is at the level H, the control unit 17 sets the discharge control signal b at the level H for a predetermined discharge period $T_2$. Thereby, an output of the AND circuit 25 of the discharge circuit 16 is set at the level H for the predetermined discharge period $T_2$ and the switching transistor 27 is conducted such that the residual electric charge accumulated in the piezoelectric element 13 is discharged via the switching transistor 27.

Here, a period from a point when the switch changeover signal a is switched from the level L to the level H, that is, a point when the period $T_1$ to maintain the switch changeover signal a at the level L ends to a point when the discharge control signal b is set at the level H, that is, a point when the predetermined discharge time $T_2$ starts, is set up by taking in consideration a response time of the switch circuit 21 of the connection switchover unit 14, that is, a time for the ON/OFF contact point of the switch circuit 21 certainly changes from an ON state to an OFF state. In addition, the predetermined discharge period $T_2$ to maintain the discharge control signal b at the level H is appropriately set (for example, approximately 1 ms) based on the threshold Vref, the drive signal for the piezoelectric element 13, intervals between sequential pressing in a continuous input and the like, such that the residual electric charge accumulated in the piezoelectric element 13 is substantially completely discharged and the output voltage of the piezoelectric element 13 becomes almost 0 V.

After discharge of the piezoelectric element 13, the control unit 17 monitors the output signal of the piezoelectric element 13 and controls each of the units based on the output signal as described above.

According to the present embodiment, as described above, the input apparatus, utilizing direct piezoelectric effect and converse piezoelectric effect of the piezoelectric element 13, uses the piezoelectric element 13 as a load sensor to detect the pressure load on the touch face of the touch sensor 11 and as an actuator to vibrate the touch face. Thereby, the same component is shared for a plurality of functions. It is thus possible to reduce the number of components and cost as well as to save space for the components for downsizing the apparatus.

In addition, after the piezoelectric element 13 is driven and provides the tactile sensation, the discharge circuit 16 discharges the residual electrical charge accumulated in the piezoelectric element 13 while the piezoelectric element 13 is electrically disconnected from the piezoelectric element drive unit 15. Thereby, it is possible to prevent continuous accumulation of the electrical charge in the piezoelectric element 13, which, as illustrated in FIG. 3, enables the tactile sensation to be reliably provided at each of sequential pressing in the continuous input without inflicting a feeling of strangeness on the operator. Moreover, since the piezoelectric element drive unit 15 is disconnected from the piezoelectric element 13 when the piezoelectric element 13 is discharged, an output terminal such as a power amplifier and the like constituting the piezoelectric element drive unit 15 is not connected to ground. Therefore, the piezoelectric element drive unit 15 is not adversely affected.

Second Embodiment

Figure 4:
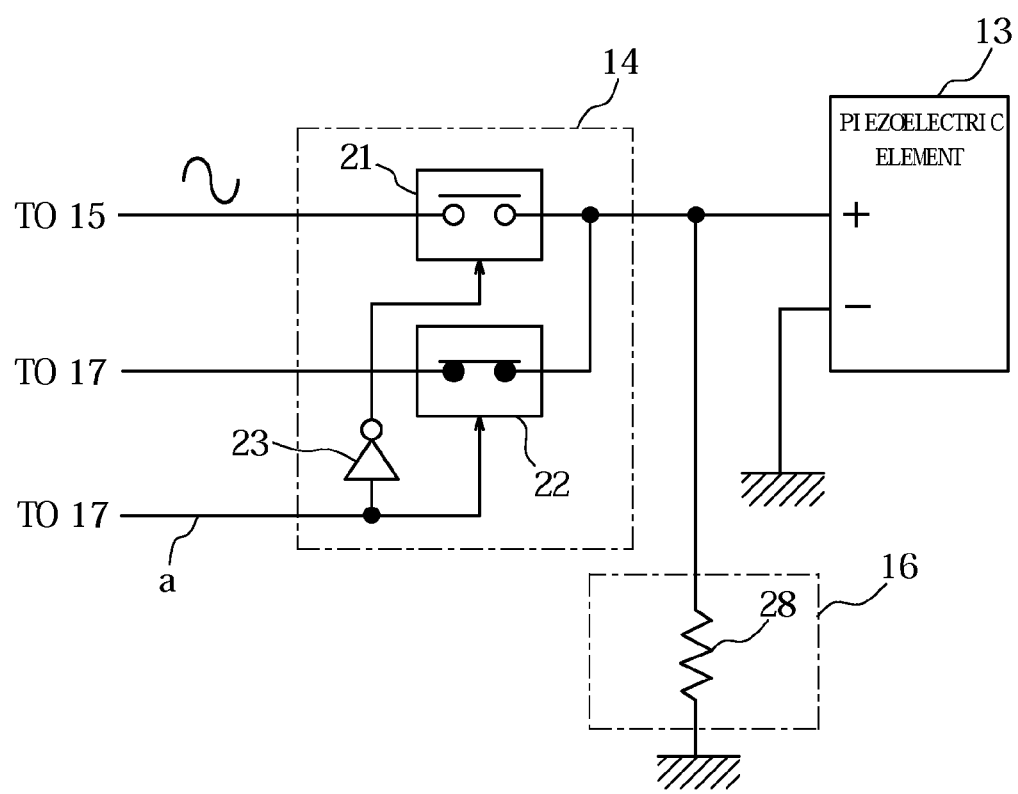
FIG. 4 is a circuit configuration diagram of a main section of an input apparatus according to a second embodiment of the present invention.
Figure 6:
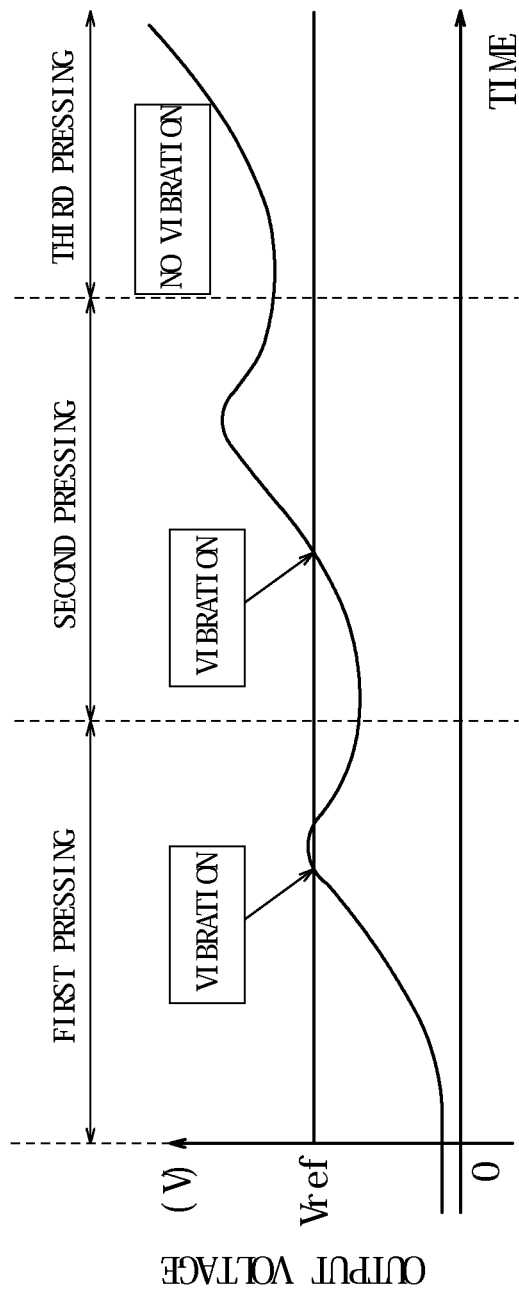
FIG. 6 is a diagram of a change in electric charge accumulated in a piezoelectric element illustrating a problem to be solved by the present invention.

FIG. 4 is a circuit configuration diagram of a main section of an input apparatus according to a second embodiment of the present invention. This input apparatus has the same configuration as that in FIG. 2, except for configuring a discharge circuit 16 by a resistor element 28 connected between the positive electrode terminal of the piezoelectric element 13 and ground in the circuit diagram illustrated FIG. 2. Therefore, the same components as those illustrated in FIG. 2 are provided with the same reference signs and descriptions thereof are omitted.

According to the input apparatus of the present embodiment, in order to discharge the residual electric charge in the piezoelectric element 13 through the resistor element 28, the piezoelectric element 13 is connected to the piezoelectric element drive unit 15 for the period $T_1$ illustrated in FIG. 3 when the piezoelectric element drive unit 15 drives the piezoelectric element 13. Thereby, the piezoelectric element 13 starts discharging the residual electric charge immediately after being driven by the piezoelectric element drive unit 15.

According to the input apparatus of the present embodiment, therefore, it is possible to obtain the same effect as the first embodiment. In addition, since the discharge circuit 16 is more simply structured in comparison to that of the first embodiment and there is no need for the discharge control signal b, the configuration and control become simpler, allowing for further reduction in the cost.

Next, an exemplary housing structure of the input apparatus according to the first and second embodiments set forth above will be described with reference to FIG. 5.

FIG. 5 illustrates an exemplary housing structure of the touch sensor 11, the display unit 12 and the piezoelectric element 13 illustrated in FIG. 1; FIG. 5(a) is a cross-sectional view of a main section, and FIG. 5(b) is a plane view of the main section. The display unit 12 is contained in a housing 31. The touch sensor 11 is disposed on the display unit 12 via insulators 32 made of elastic members. According to the present embodiment, the touch sensor 11 is disposed on the display unit 12 via the insulators 32 arranged at four corners outside a display area A of the display unit 12 illustrated by a chain double-dashed line in FIG. 5(b).

The housing 31 is provided with an upper cover 33 covering a surface area of the touch sensor 11 outside the display area of the display unit 12. For a dust-proof purpose, an insulator 34 made of elastic member is arranged between the upper cover 33 and the touch sensor 11.

The touch sensor 11 illustrated in FIG. 5 may have, for example, a surface member having a touch face 11a and constituted by a transparent film or the glass, and a rear face member constituted by the glass or acryl. The touch sensor 11 is designed such that, when the touch face 11a is pressed down via the insulator 34, a pushed part and an entire touch sensor 11 are bent (strained) slightly in accordance with the pressure.

The piezoelectric element 13 is provided on the rear face of the touch sensor 11 at a position covered by the upper cover 33 close to a periphery on one side or each of a plurality of sides, for example, three sides. These three piezoelectric elements 13 detect the pressure load on the touch face 11a of the touch sensor 11 and vibrate the touch sensor 11 such that the tactile sensation is provided to the pressing object pressing the touch face 11a. It is to be noted that the housing 31, the upper cover 33 and the insulator 34 illustrated in FIG. 5(a) are omitted in FIG. 5(b).

Here, the three piezoelectric elements 13 are connected to the piezoelectric element drive unit 15 via the connection switchover unit 14 and driven by a common drive signal or individual drive signals. In addition, the three piezoelectric elements 13 supply the outputs in parallel to the control unit 17 via the connection switchover unit 14. Further, the discharge circuit is provided for each of the three piezoelectric elements 13.

Then, the control unit 17 calculates the pressure load based on the output signals from the three piezoelectric elements 13. Preferably, results of calculation of the pressure loads are approximately the same when the operator feels nearly the same pressure sensation (hard feeling, soft feeling and the like) at each position on the touch face 11a. To that end, the control unit 17 calculates the pressure load based on, for example, an average value of the outputs of the three piezoelectric elements, a weighted additional value and the like. Additionally, it is preferable to apply individual drive signals to the three piezoelectric elements 13 such that the operator obtains nearly the same pressure sensation and nearly the same tactile sensation (feeling of texture and the like) at each position on the touch face 11a. Therefore, the piezoelectric element drive unit 15 appropriately changes amplitude, a phase and the like of each of the drive signals in accordance with a position and a location on the touch face 11a such that an approximately identical feeling of a combination of the pressure sensation and the tactile sensation is obtained.

Next, the standard of the pressure load to provide the tactile sensation in each of the above embodiments and the drive signal to drive the piezoelectric element 13 will be described.

The standard of the pressure load to provide the tactile sensation may be appropriately set in accordance with a load characteristic of an intended push-button switch in pressing. For example, the standard is set to be equal to a load at which the touch sensor 11 responds to the touch input (synchronizing a timing to provide the tactile sensation with a timing of response to the touch input by the touch sensor 11) or to be higher than the load at which the touch sensor 11 responds to the touch input (setting the timing to provide the tactile sensation later than the timing of response to the touch input by the touch sensor 11). For example, when the input apparatus according to the present embodiment is applied to a mobile terminal, it is preferable to set the standard equal to or higher than the load at which the touch sensor 11 responds to the touch input (setting the timing to provide the tactile sensation later than the timing of response to the touch input by the touch sensor 11). Preferably, the standard is set by users as desired, such that an elder user may set it heavier (slower), whereas a user who often writes messages may set it lighter (quicker).

In addition, the drive signal to drive the piezoelectric element 13 by the piezoelectric element drive unit 15 may be appropriately determined based on the tactile sensation to provide. For example, in order to provide a click sensation "Cli", which is obtained when pressing the push-button switch employed by the mobile terminal, the piezoelectric element drive unit 15 drives the piezoelectric element 13 as follows. Upon application of the pressure load satisfying the standard set forth above, the drive signal, for example, a sine wave with a constant frequency of, for example, 100 Hz to 200 Hz, preferably 170 Hz, for 1 period is applied to the piezoelectric element 13 such that the touch face of the touch sensor 11 is vibrated by approximately 15 μm while the pressure load satisfying the standard is applied thereto. Thereby, it is possible to allow the operator to recognize that an input operation is completed, by providing a realistic click sensation to the operator through the pressing object (pressing means) pressing the touch face of the touch sensor 11. Similarly, in order to provide another click sensation "Click", which is a sensation harder than the click sensation "Cli", the piezoelectric element drive unit 15 applies the drive signal, for example, a sine wave or a square wave with a frequency of, for example, approximately 200 Hz to 500 Hz, for 1 period to the piezoelectric element 13.

In order to provide the tactile sensation different from the click sensation such as, for example, a soft tactile sensation such as a "throbbing" sensation and a "jelly-like" sensation, the drive signal, for example, a sine wave with a frequency of approximately 200 Hz to 500 Hz, for two or three periods is applied. Alternatively, in order to provide a "vibrating" sensation, the drive signal, for example, a sine wave with a frequency of approximately 200 Hz to 500 Hz, for four or more periods is applied.

Preferably, information on the drive signals to provide those various tactile sensations is stored in a memory unit (not illustrated) such that the user appropriately set the drive signal to provide a desired tactile sensation. It is also preferable, based on the drive signal set, to automatically set the period $T_1$ illustrated in FIG. 3 in which the switch changeover signal a is maintained at the level L.

As described above, the control unit 17 does not drive the piezoelectric element 13 until the load applied to the touch sensor 11 calculated based on the output of the piezoelectric element 13 satisfies the standard to provide the tactile sensation (for example, 1 N). Thereby, a tactile sensation of the operator is stimulated. Then, when the load satisfies the standard, the control unit 17 controls the piezoelectric element drive unit 15 to drive the piezoelectric element 13 with the predetermined drive signal such that the touch face 11a is vibrated to stimulate the tactile sensation. Thereby, the tactile sensation is provided to the operator such that the operator recognizes that the input operation is completed. Accordingly, even if the button switch such as the push-button switch (push-type button switch) is graphically depicted on the touch sensor, the operator performs the input operation with the touch sensor 11 feeling the realistic click sensation similar to that obtained when operating the push-button switch. Thus, the operator may not have the feeling of strangeness. Moreover, since the operator carries out the input operation in conjunction with perception to "have pressed" the touch sensor 11, it prevents erroneous inputs caused by mere tapping.

In addition, when the standard of the pressure load to provide the tactile sensation is set higher than the load at which the touch sensor 11 responds to the touch input (setting the timing to provide the tactile sensation later than the timing of response to the touch input by the touch sensor 11), the control unit 17 determines an input position according to a touch operation to the touch face 11a and changes the display state of the input object at a corresponding portion of the display unit 12. Then, when the pressure load on the touch face 11a detected based on the output from the piezoelectric element 13 satisfies the standard to provide the tactile sensation, the control unit 17 drives the piezoelectric element 13 to provide the tactile sensation and also execute a predetermined operation (for example, execution and processing of a program corresponding to the object) by confirming the input position. In this case, the operator confirms that the input object is selected, by seeing a change of the display state of the input object displayed on the display unit 12. Moreover, since the click sensation is provided to the operator upon pressing the touch face 11a, the operator recognizes that the input object selected is determined (executed). Thereby, erroneous inputs by a so-called wandering finger are prevented.

In providing the click sensation of the push-button switch, it is also possible to provide the same click sensation as that described above in releasing (in this case, release sensation) by driving the piezoelectric element 13 with the drive signal, the same as that in pressing, when the pressure load fails to satisfy the predetermined standard. It is to be appreciated that the drive signal for providing the release sensation does not necessarily need to be the same as that for the click sensation.

In this case, the residual electric charge of the piezoelectric element 13 is discharged through the discharge circuit 16 after providing the release sensation in releasing, without discharging the residual electric charge in the piezoelectric element 13 after providing the click sensation in pressing. Thereby, it is possible to provide a more realistic click sensation, such as the click sensation "Cli" in pressing and a click sensation "Ck" in releasing. The tactile sensations "Cli", "Ck", "Click", the "throbbing" sensation, the "jelly-like" sensation and the "vibrating" sensation set forth in the present specification are sensations obtained by the operator described in Japanese. Examples of the drive signals to provide actual tactile sensations are set forth above.

Here, although the standard of the load to provide the release sensation may be set to be the same as the standard to provide the click sensation in pressing set forth above, it is preferable to set the standard of the load to provide the release sensation to be 50-80% lower than that to provide the click sensation in pressing. Thereby, timings to provide the tactile sensations are synchronized with timings of sequential inputs when the same position (input object) is repeatedly input (tapped), providing the realistic click sensation without the feeling of strangeness. That is, setting the standard of the load to provide the tactile sensation in releasing to be smaller than that in pressing enables to prevent the feeling of strangeness. In addition, setting the standard of the load to provide the tactile sensation in releasing to be approximately 50% or more of that in pressing contributes to a significant improvement in operability in the repetitive input. Moreover, setting the standard of the load to provide the tactile sensation in releasing to be approximately 80% or less of that in pressing enables to deal with a faint load change in a holding state in the repetitive input.

It is to be understood that the present invention is not limited to the embodiments set forth above and various changes may be implemented within the spirit of the present invention. For example, the switch circuits 21, 22 in FIG. 2 may include a single switch circuit having two contact points. In addition, the switching transistor 27 of the discharge circuit 16 illustrated in FIG. 2 may include a semiconductor relay and the like. Further, the piezoelectric element 13 may have a known configuration such as monomorph, unimorph, bimorph and a laminated type, based on a size, vibration amplitude and the like of the touch sensor 11.

The present invention is effectively applicable to the input apparatus in which the touch sensor serves as a touch switch for ON/OFF operations. In addition, the input apparatus according to the present invention drives the piezoelectric element when the pressure load detected based on the output of the piezoelectric element satisfies the standard to provide the tactile sensation. Here, "when the pressure load detected based on the output of the piezoelectric element satisfies the standard to provide the tactile sensation" may include either "when the pressure load detected reaches a standard value for providing the tactile sensation", "when the pressure load detected exceeds the standard value for providing the tactile sensation", or "when the standard value to provide the tactile sensation is detected based on the output of the piezoelectric element".

REFERENCE SIGNS LIST 11 touch sensor
11a touch face
12 display unit
13 piezoelectric element
14 connection switchover unit
15 piezoelectric element drive unit
16 discharge circuit
17 control unit
31 housing
32 insulator
33 upper cover
34 insulator

The invention claimed is:

1. An input apparatus comprising:
a touch sensor configured to detect a touch input;
a piezoelectric element mounted on the touch sensor;
a piezoelectric element drive unit configured to drive the piezoelectric element;
a control unit configured to detect a pressure load on a touch face of the touch sensor based on an output signal of the piezoelectric element and to control the piezoelectric element drive unit, when the pressure load detected satisfies a standard to provide a tactile sensation, to drive the piezoelectric element such that the tactile sensation is provided to an object pressing the touch face;
a connection switchover unit configured to selectively connect the piezoelectric element to the control unit or the piezoelectric element drive unit; and
a discharge circuit connected between the piezoelectric element and the connection switchover unit, and configured to discharge electric charge accumulated in the piezoelectric element, wherein
the control unit, when the pressure load detected based on the output signal of the piezoelectric element input via the connection switchover unit satisfies the standard, controls the connection switchover unit to connect the piezoelectric element to the piezoelectric element drive unit such that the piezoelectric element is driven by the piezoelectric element drive unit, and then
the control unit controls the discharge circuit to discharge the electric charge accumulated in the piezoelectric element by controlling the connection switchover unit to connect the piezoelectric element to the control unit.

2. The input apparatus according to claim 1, wherein
the discharge circuit has a switching element connected between the piezoelectric element and ground, and
the control unit, after vibration of the piezoelectric element by the piezoelectric element drive unit, conducts the switching element for a predetermined period such that the electric charge accumulated in the piezoelectric element is discharged.

3. The input apparatus according to claim 1, wherein the discharge circuit has a resistor element connected between the piezoelectric element and ground.

4. A control method of an input apparatus including
a touch sensor configured to detect a touch input,
a piezoelectric element mounted on the touch sensor,
a piezoelectric element drive unit configured to drive the piezoelectric element,
a connection switchover unit configured to selectively connect the piezoelectric element to the piezoelectric element drive unit,
a discharge circuit connected between the piezoelectric element and the connection switchover unit, and configured to discharge electric charge accumulated in the piezoelectric element, and
a control unit, the method comprising the steps of:
detecting a pressure load on a touch face of the touch sensor based on an output signal of the piezoelectric element and controlling the connection switchover unit, when the pressure load detected satisfies a standard to provide a tactile sensation, to connect the piezoelectric element to the piezoelectric element drive unit and controlling the piezoelectric element drive unit to drive the piezoelectric element such that the tactile sensation is provided to an object pressing the touch face; and
then controlling the discharge circuit to discharge the electric charge accumulated in the piezoelectric element by controlling the connection switchover unit to connect the piezoelectric element to the control unit.

* * * * *